United States Patent [19]

Takanashi

[11] Patent Number: 5,757,532
[45] Date of Patent: May 26, 1998

[54] OPTICAL SCANNER

[75] Inventor: Kenichi Takanashi, Inba-gun, Japan

[73] Assignee: Ricoh Company, Ltd., Tokyo, Japan

[21] Appl. No.: 676,723

[22] Filed: Jul. 8, 1996

[30] Foreign Application Priority Data

Jul. 10, 1995 [JP] Japan .................... 7-173415

[51] Int. Cl.[6] .................................... G02B 26/08
[52] U.S. Cl. ................ 359/196; 359/205; 359/212; 359/216; 359/227; 347/258
[58] Field of Search ................... 359/196–226, 359/227, 232; 347/256–261

[56] References Cited

U.S. PATENT DOCUMENTS 5,227,811  7/1993  Kohsaka .................. 359/216
5,477,373  12/1995  Nakamura et al. ............ 359/216

*Primary Examiner*—James Phan
*Attorney, Agent, or Firm*—Oblon, Spivak, McClelland, Maier & Neustadt, P.C.

[57] ABSTRACT

An optical scanner which causes a light beam to impinge on a photosensitive body along an optical axis. The light beam passes through a lens in a transparent parallel plate before impinging on the photosensitive body. The transparent parallel plate through which the light beam passes is positioned at a predetermined non-perpendicular angle of inclination with respect to the optical axis. This inclination of the transparent parallel plate prevents reflected light from the transparent parallel plate from being deflected off the lens and back onto the photosensitive body, and thereby prevents a formation of spurious or ghost images on the photosensitive body. Further, the inclination of the transparent parallel plate allows the image scanner to have a more compact size.

16 Claims, 7 Drawing Sheets

OPTICAL SCANNER

BACKGROUND OF THE INVENTION

1. Field of the Invention

The present invention is directed to an optical scanner used in an image forming apparatus such as a digital copier, a laser beam printer, a facsimile machine, etc., and more particularly, the optical scanner of the present invention includes a transparent parallel plate for dust proofing.

2. Discussion of the Background

In an optical scanner, a light beam deflected by a deflector is converged on a scanned face of a photosensitive body as a light spot by an image forming lens, and is scanned on the scanned face of the photosensitive body. An electrostatic latent image is thereby formed on the scanned face of the photosensitive body by this scanning operation. Toner is then applied to the electrostatic latent image to develop a recording image.

In a process of image forming, dust, such as unnecessary toner and paper particles from a recording paper on which the recording image is fixed, may drift and float in the air in the optical scanner. If the dust, such as the unnecessary toner or paper particles, drifts inside of the optical scanner and becomes attached to the image forming lens, the image forming process is deteriorated.

To prevent this deterioration of the image forming process, a housing of the optical scanner is provided to partially shield the image forming lens from the dust, such as the unnecessary toner and paper particles, drifting thereto. Further, a transparent parallel plate is arranged on the housing of the optical scanner for further preventing the dust, such as the unnecessary toner or paper particles, from reaching the image forming lens, i.e., the transparent parallel plate operates as a shield for dust proofing.

A background device is shown in FIG. 10 of the present specification as an example, which has such a transparent parallel plate. As is shown in FIG. 10, in such a background device an optical scanner includes a deflector 1, an image forming lens 2, a transparent parallel plate 3 and a photosensitive body 4. The deflector 1 deflects light along an optical axis 15, onto the photosensitive body 4. The transparent parallel plate 3 is formed at a 90° angle with respect to the optical axis 15.

Such a transparent parallel plate 3 is arranged perpendicular to the optical axis with respect to the cross scan-corresponding direction. The cross scan-corresponding direction is set to a direction corresponding and parallel to a cross scanning on the optical axis 15.

However, the above-mentioned optical scanner of FIG. 10 has a drawback in that a part of the light beam which has passed through the image forming lens 2 is reflected back toward the image forming lens 2 from the transparent parallel plate 3 (see the double headed arrow light beam in FIG. 10). The reflected light beam from the transparent parallel plate 3 then impinges on the flat face of the image forming lens 2, and is then reflected off this flat face of the image forming lens 2 (i.e., a twice reflected light beam is generated) back through the transparent parallel plate 3 onto the photosensitive body 4.

That is, the twice reflected light beam from the image forming lens 2 then again passes through the transparent parallel plate 3 and reaches the scanned face of photosensitive body 4 as a spurious or ghost image, which deteriorates the recording image.

One solution to this problem is to form an anti-reflection coating on the flat face of the image forming lens 2. However, in such a background device, the image forming lens 2 is often formed of plastic. In such a case, it is expensive to form an anti-reflection coating on the flat face of the image forming lens 2.

SUMMARY OF THE INVENTION

Accordingly, one object of the present invention is to provide a novel optical scanner for an image forming apparatus which can solve the aforementioned drawbacks. In this way, one object of the present invention is to provide a novel optical scanner in which a part of a light beam reflected from a transparent parallel plate is prevented from reaching an image forming lens.

Further, this structure of the present invention allows such a reflection to be reduced without requiring formation of an expensive anti-reflection coating on a lens.

It is another object of the present invention to provide a novel optical scanner in which a part of a light beam reflected from an image forming lens is prevented from reaching a scanned face of a photosensitive body as a spurious or ghost image.

The novel optical scanner of the present invention also achieves such objectives in a compact device which also has a reduced size.

The present invention achieves such objectives by forming an optical scanner which causes a light beam to impinge on a photosensitive body along an optical axis. The light beam passes through a lens and a transparent parallel plate before impinging on the photosensitive body. The transparent parallel plate through which the light beam passes is positioned at a predetermined non-perpendicular angle of inclination with respect to the optical axis. This inclination of the transparent parallel plate prevents reflected light from the transparent parallel plate from being deflected off the lens and back onto the photosensitive body, and thereby prevents spurious or ghost images from being formed on the photosensitive body. Further, the inclination of the transparent parallel plate allows the device of the present invention to be formed in a more compact size.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
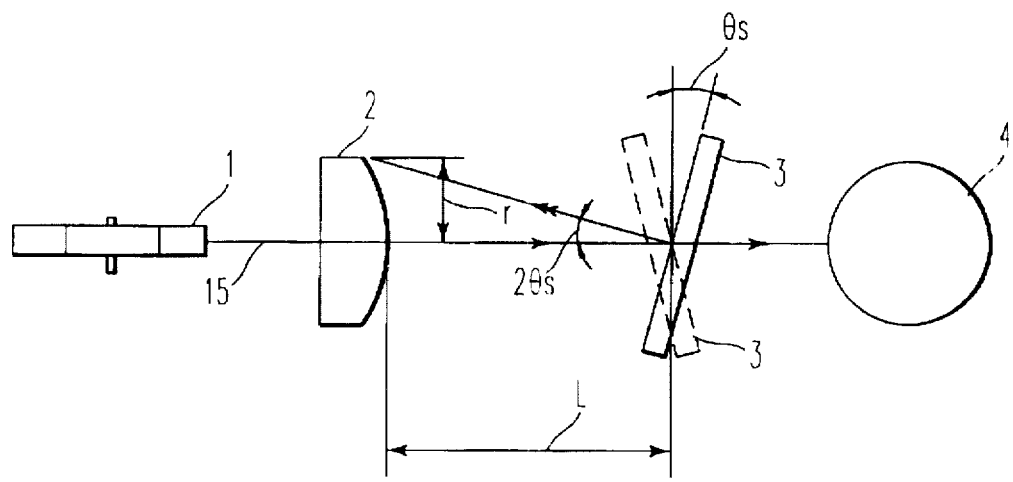
FIG. 1 is a diagram showing an overall structure of an embodiment of an optical scanner in accordance with the present invention.

Preferred embodiments of an optical scanner for an image forming apparatus in accordance with the present invention will now be explained with reference to the accompanying drawings, wherein like reference numerals are utilized to designate identical or corresponding elements throughout the several views.

FIG. 1 is a diagram showing an overall structure of a first embodiment of an optical scanner in accordance with the present invention. As shown in FIG. 1, in a first embodiment the optical scanner is provided with a light source (not shown), a deflector 1, an image forming lens 2, a transparent plate 3 with parallel faces, and a photosensitive body 4.

A laser diode or a light emitting diode may be used as the light source (not shown). A light beam from the light source is emitted onto the deflector 1 as a parallel light beam, a divergent light beam or as a convergent light beam through a coupling lens (not shown). As examples, a polygon mirror, a rotary dihedral mirror or a rotary unifacial mirror such as a so-called tenon type mirror, a pyramida mirror, or a swinging mirror such as a galvano-mirror may be used as the deflector 1.

In order to compensate for a small angle formed between a reflecting face of the deflector 1 and a rotating axis thereof, the light beam impinging onto the deflector 1 is converged in a cross scan-corresponding direction. The light beam is thus focused and formed as a linear light beam extending in a main scan-corresponding direction on the vicinity of the reflecting face of the deflector 1.

The light beam deflecting off deflector 1 then passes through image forming lens 2. A fθ lens may be used as the image forming lens 2, if the deflector 1 is a rotating mirror. Also, a f sin θ lens may be used as the image forming lens 2, if the deflector 1 is a swinging mirrors The image forming lens 2 has a function for performing an optical scanning operation at an equal speed in addition to an image forming function.

The light beam passing through image forming lens 2 then passes through transparent parallel plate 3 to impinge on photosensitive body 4. The photosensitive body 4 may be formed in a shape of a drum and may be arranged such that a scanning line of the photosensitive body 4 is in conformity with a scanned face thereof.

As illustrated in FIG. 1, the transparent parallel plate 3 is provided for dust proofing, i.e., is provided to prevent dust from the photosensitive body 4 from reaching the image forming lens 2. The transparent parallel plate 3 may be made of glass, and has an elongated shape in a direction parallel to the photosensitive body 4. The transparent parallel plate 3 is formed on a housing of the optical scanner so that dust, such as unnecessary toner and paper particles which are floating in the air, do not enter into an inside of the optical scanner, and do not reach image forming lens 2.

Moreover, according to the present invention, the transparent parallel plate 3 is inclined with respect to a cross scan-corresponding direction with an inclination angle θs, i.e., transparent parallel plate 3 is at a non-perpendicular angle with respect to the optical axis 15.

According to the present invention, by having transparent parallel plate 3 inclined as shown in FIG. 1, light reflecting off transparent parallel plate 3, shown as double headed arrow light beams, and which would then subsequently also reflect off image forming lens 2, does not impinge on the photosensitive body 4. This prevents spurious or ghost images from being formed on the photosensitive body 4, while still providing a dust proofing feature.

More particularly, and as shown in FIG. 1, a part of a light beam which has passed through the image forming lens 2 is reflected on the transparent parallel plate 3. The reflected light beam from the transparent parallel plate 3 is inclined with respect to the direction of an optical path, i.e., the optical axis 15 shown in FIG. 1, from the image forming lens 2 with an inclination angle 2θs.

The reflected light beam from the transparent parallel plate 3 can be made to not impinge on the image forming lens 2 by adjusting the inclination angle θs to exceed a predetermined value, which is also based on the distance L from the image forming lens 2 to the transparent parallel plate 3 and the radius r of the image forming lens 2. The thickness of the transparent parallel plate 3 is also a factor to be considered as the thicker the transparent parallel plate 3, the less the required angle of θs.

As one specific example of an embodiment of the present invention, assume that the transparent parallel plate 3 has a thickness of 1.9 mm, the radius r of the image forming lens 2 is 8 mm and the distance L from the front of the image forming lens 2 to a center of the transparent plate 3 is 76 mm; in this example, the angle θs of inclination of the transparent plate may be set to 3° to achieve a beneficial operation.

With this structure in the present invention, light along the optical axis 15 shown in FIG. 1 which reflects off the transparent parallel plate 3 does not impinge on the image forming lens 2, and thus is not reflected off the image forming lens 2 onto the photosensitive body 4. This thereby prevents spurious or ghost images from being formed on the photosensitive body 4.

As shown in FIG. 1, and as applies to the further embodiments discussed below, the transparent parallel plate 3 can also be inclined in an opposite direction, as shown in the dotted lines, to achieve the same effect.

Moreover, this structure of the present invention also provides a significant advantage that the optical scanner can be made more compact as the effective length of the transparent parallel plate 3 is reduced.

Figure 2:
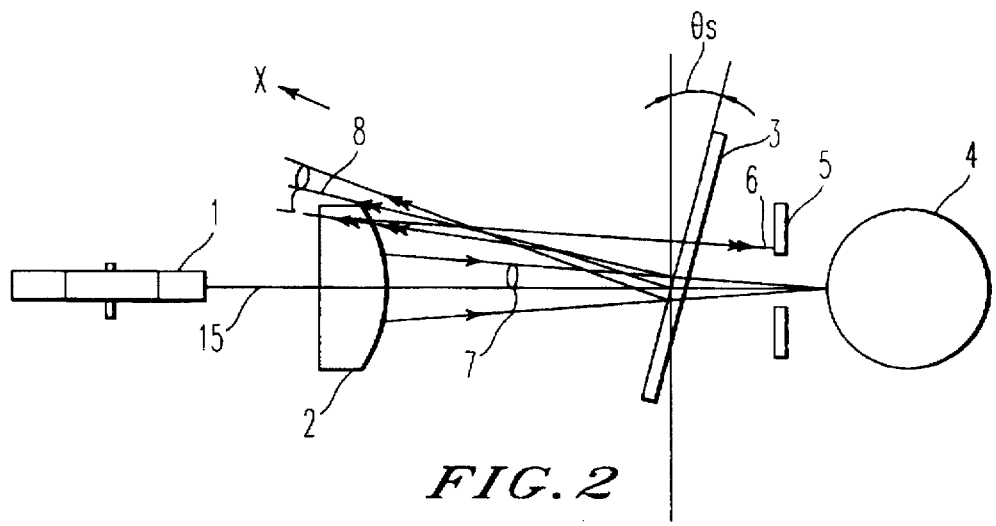
FIG. 2 is a diagram showing an overall structure of a further embodiment of an optical scanner in accordance with the present invention.

FIG. 2 is a diagram showing an overall structure of a further embodiment of an optical scanner in accordance with the present invention.

In the embodiment illustrated in FIG. 2, the inclination angle θs of the transparent parallel plate 3 is determined so that a condition that only 50% of the reflected light from the transparent parallel plate 3 to the image forming lens 2 impinges on the image forming lens 2. The 50% of the reflected light is converged and then is diverged in X direction. As shown in FIG. 1, a radius of the image forming lens 2 in the cross can-corresponding direction is defined as r, and a distance between the transparent parallel plate 3 and the image forming lens 2 is defined as L.

When the light beam is reflected off the transparent parallel plate 3 such that the reflected light beam has an inclination angle of 2θs, a location at which the reflected light beam impinges onto the image forming lens 2 in the cross scan-corresponding direction is L. tan 2θs.

In FIG. 2, when the 50% of the light reflected off of the transparent parallel plate 3 impinges onto the image forming lens 2, the following conditions (1), (2), (3) are satisfied.

$$L \cdot \tan 2\theta s = r \tag{1}$$

$$2\theta s = \tan^{-1}(r/L) \tag{2}$$

$$\theta s = \{\tan^{-1}(r/L)\}\frac{1}{2} \tag{3}$$

If the inclination angel θs of the transparent parallel plate 3 is increased, less than 50% of the light reflected off of the transparent parallel plate 3 impinges onto the image forming lens 2. However, with an increasing of the inclination angle θs, a shape of the light spot emitted on the photosensitive body 4 is distorted, and the image forming process is deteriorated. The inclination angle θs of the transparent parallel plate 3 may typically be between 2° and 10°, and an upper limit of the inclination angel θs of the transparent parallel plate 3 may be approximately 20°.

As shown in FIG. 2, the reflected light beam from the transparent parallel plate 3 impinges onto the image forming lens 2 and is then reflected off the image forming lens 2 (i.e., twice reflected light is generated). The twice reflected light from the image forming lens 2 then passes through the transparent parallel plate 3. To further prevent this twice reflected light from reaching the photosensitive body 4, a shading member 5 is provided, and this shading member 5 further prevents spurious or ghost images from being formed on the scanned face of the photosensitive body 4. The shading member 5 may be arranged between the transparent parallel plate 3 and the photosensitive body 4 as shown in FIG. 2, and can be formed as a slit member 5 also as shown in FIG. 2.

A width of an opening in the shading member 5 and a position in which the shading member 5 is arranged is determined in a condition that the light beam 7 (the desired light for forming the latent image on the photosensitive body) is allowed to impinge onto the photosensitive body 4 and the light beam 6 (the twice reflected light) is blocked from impinging onto the photosensitive body by the shading member 5.

Figure 3:
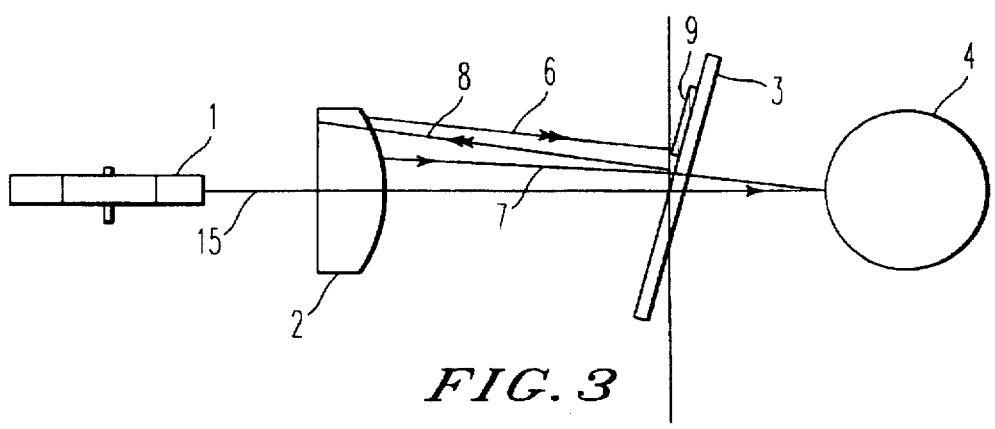
FIG. 3 is a diagram showing an overall structure of a further embodiment of an optical scanner in accordance with the present invention.

FIG. 3 is a diagram showing an overall structure of a further embodiment of an optical scanner in accordance with the present invention.

As illustrated in FIG. 3, a shading layer 9 operating as a shading member is formed on a surface of the transparent parallel plate 3. An area of the shading layer 9 on the transparent parallel plate 3 is determined in a condition that the light beam 7 impinges onto the photosensitive body 4 and the light beam 6 is blocked by the shading layer 9.

Figure 4:
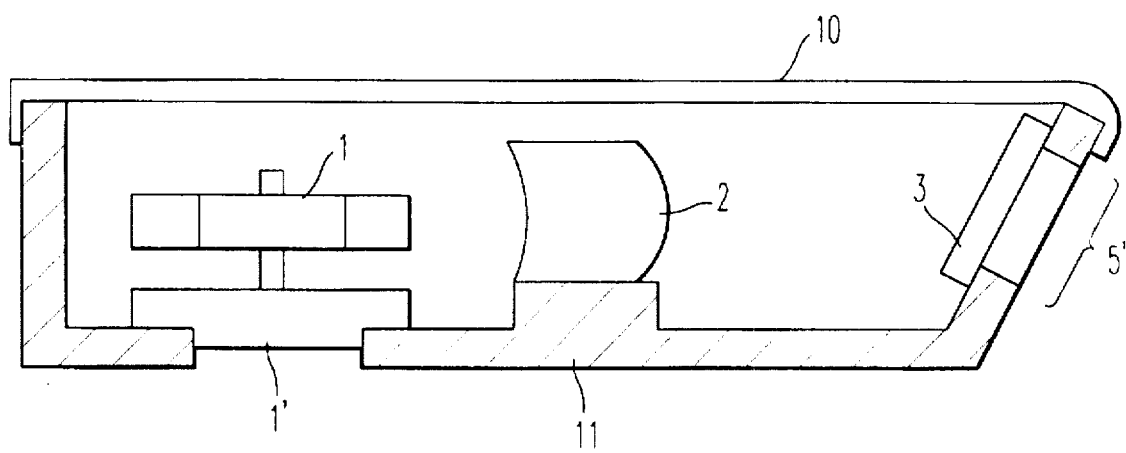
FIG. 4 is a section showing a housing of an optical scanner in accordance with an embodiment of the present invention.

FIG. 4 shows a section of a housing of the optical scanner in accordance with the present invention.

As illustrated in FIG. 4, a motor 1' for driving the deflector 1 and a cover 10 for the optical scanner are provided on a housing 11. The transparent parallel plate 3 is arranged at an opening 5' formed on the housing 11 of the optical scanner. The opening 5' on the housing 11 is inclined in the cross scan-corresponding direction so that the transparent parallel plate 3 is inclined in the cross scan-corresponding direction, as discussed above.

Figure 5:
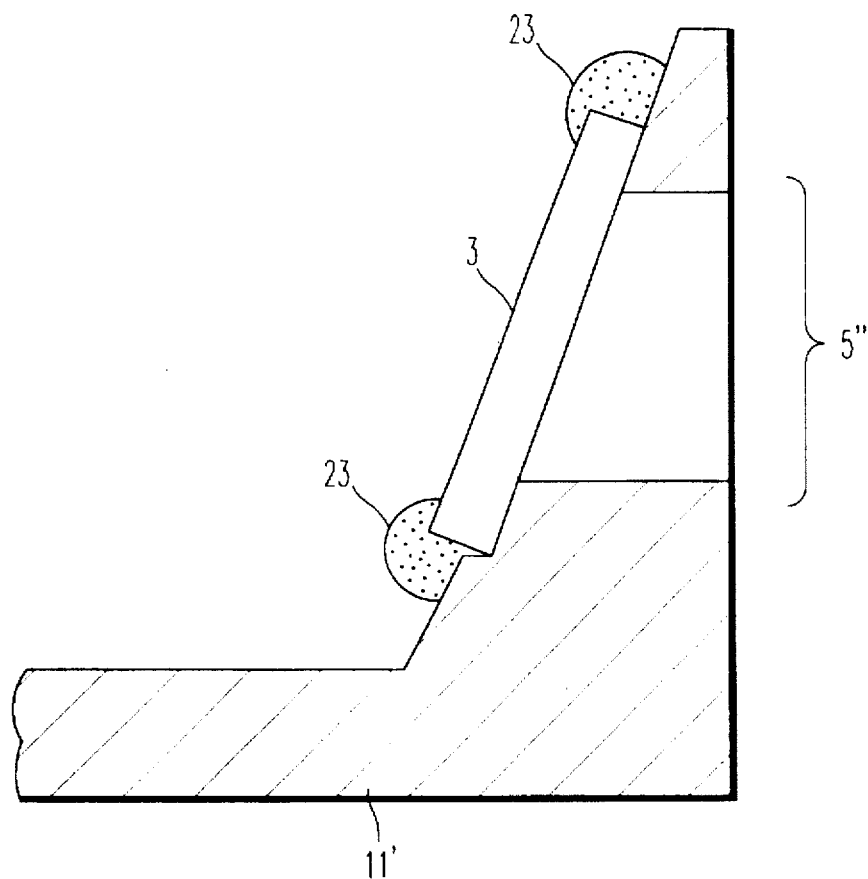
FIG. 5 is a section showing an enlarged part of the housing of an optical scanner in accordance with the present invention.

FIG. 5 is a section showing a part of the housing of FIG. 4 of the optical scanner in an enlarged view in accordance with the present invention. As illustrated in FIG. 5, a holding portion for the transparent parallel plate 3 on an inner surface of the housing 11' is inclined in the cross scan-corresponding direction. An outer surface of the housing 11' near an opening 5" is not inclined. The transparent parallel plate 3 is fixed on the opening 5" on the housing 11' with a bond 23.

FIGS. 6–10 show further embodiments of the present invention.

Figure 6:
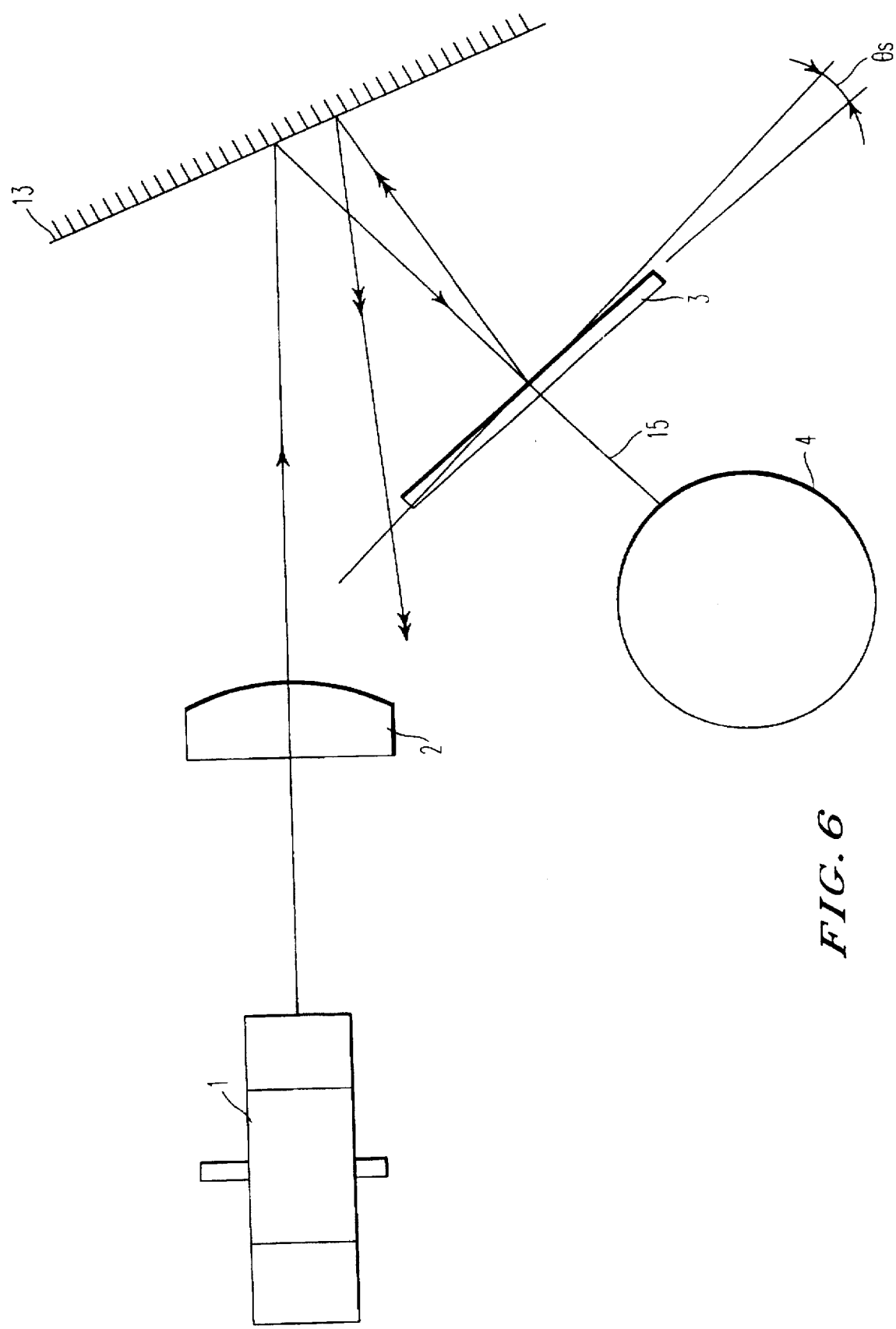
FIG. 6 is a diagram showing an overall structure of a further embodiment of an optical scanner in accordance with the present invention.

In the further embodiment of the present invention as shown in FIG. 6, a mirror 13 is formed between the image forming lens 2 and the photosensitive body 4. However, this embodiment as shown in FIG. 6 again utilizes a transparent parallel plate 3 at a non-perpendicular angle with respect to an optical axis 15. As shown in FIG. 6, again this non-perpendicular angle is θs. In this way, the device disclosed in FIG. 6 can achieve the same benefits as the device in FIG. 1. That is, in the device shown in FIG. 6, the light reflected off the transparent parallel plate 3 does not impinge on the image forming lens 2, and thus is not re-reflected back towards the photosensitive body 4. Thus, spurious or ghost images are prevented from being formed on the photosensitive body 4. Further, the angling of this transparent parallel plate 3 allows a more compact design in such an optical scanner.

Figure 7:
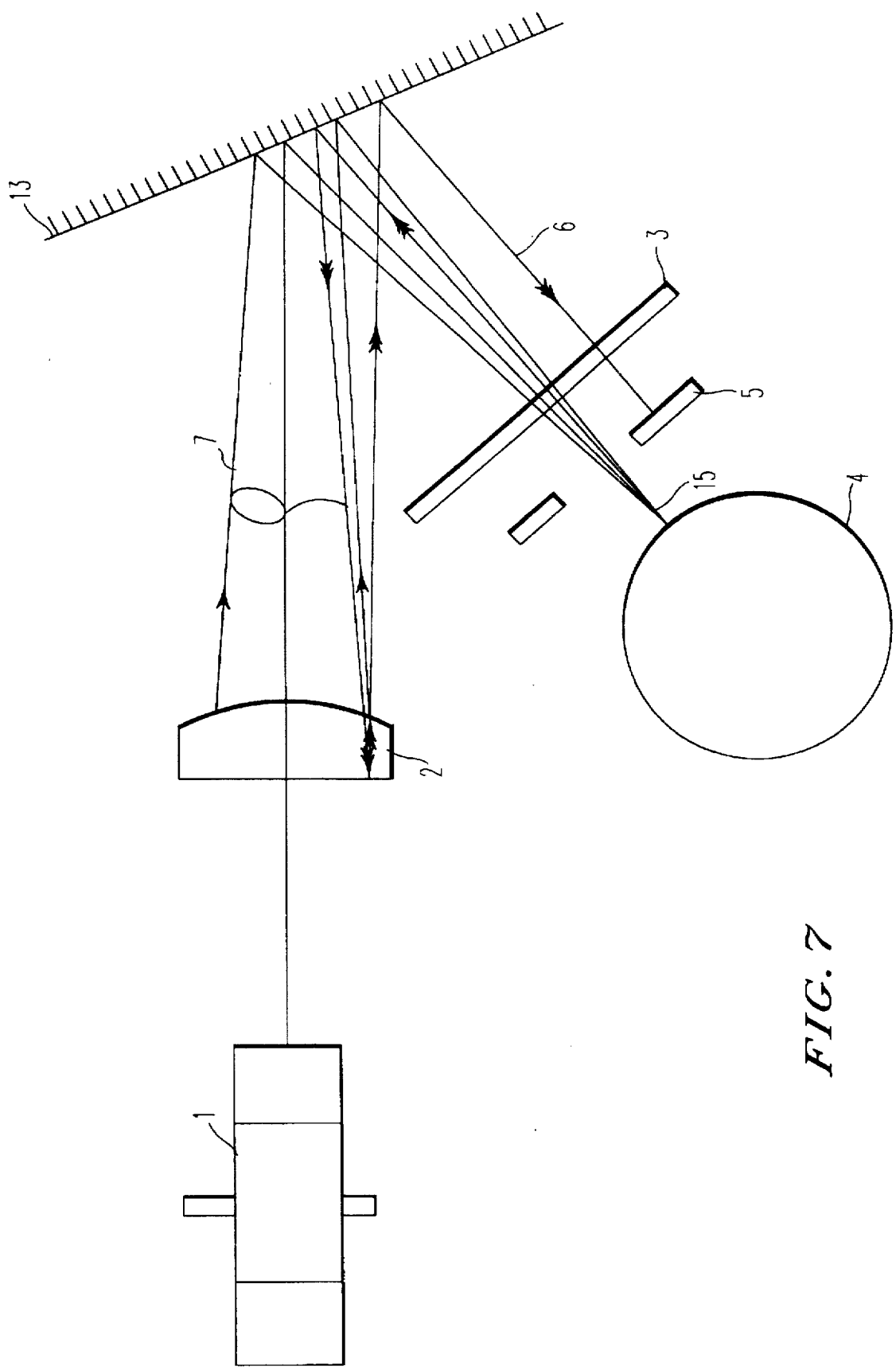
FIG. 7 is a diagram showing an overall structure of a further embodiment of an optical scanner in accordance with the present invention.

A further embodiment of the present invention as shown in FIG. 7 also employs mirror 13, but operates on a similar principal as that in FIG. 2 in that shading member 5 formed as a slit can be provided. Similarly as discussed above with respect to the embodiment of FIG. 2, in this embodiment of the present invention, the angle of inclination of the transparent parallel plate 3 is selected such that 50% of the reflected light on the transparent parallel plate 3 does not impinge on the photosensitive body 4, and further the shading member 5 is provided to even further reduce the light impinging on the photosensitive body 4.

Figure 8:
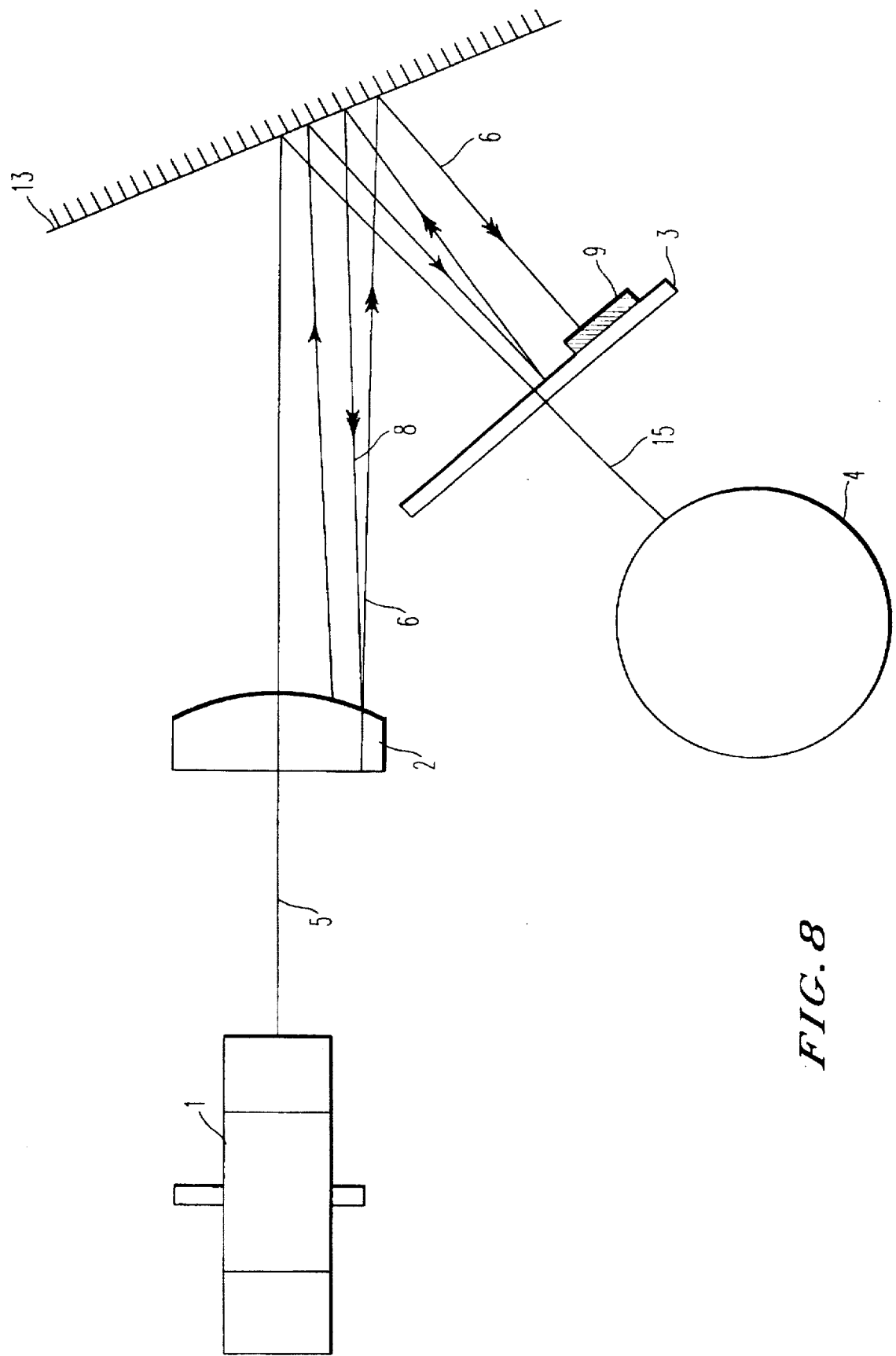
FIG. 8 is a diagram showing an overall structure of a further embodiment of an optical scanner in accordance with the present invention.
Figure 9:
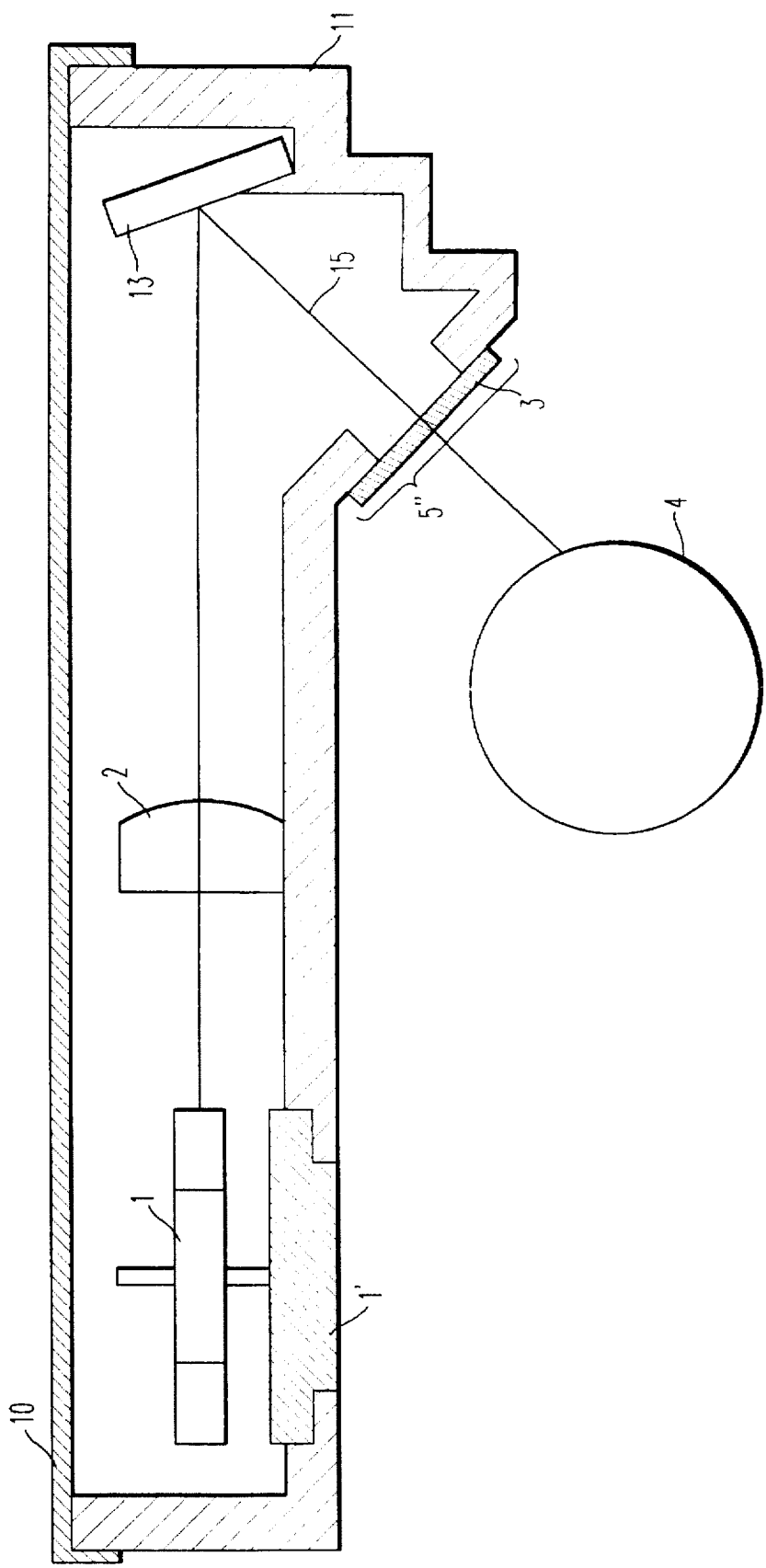
FIG. 9 is a section showing a further housing of an optical scanner in accordance with an embodiment of the present invention.
Figure 10:
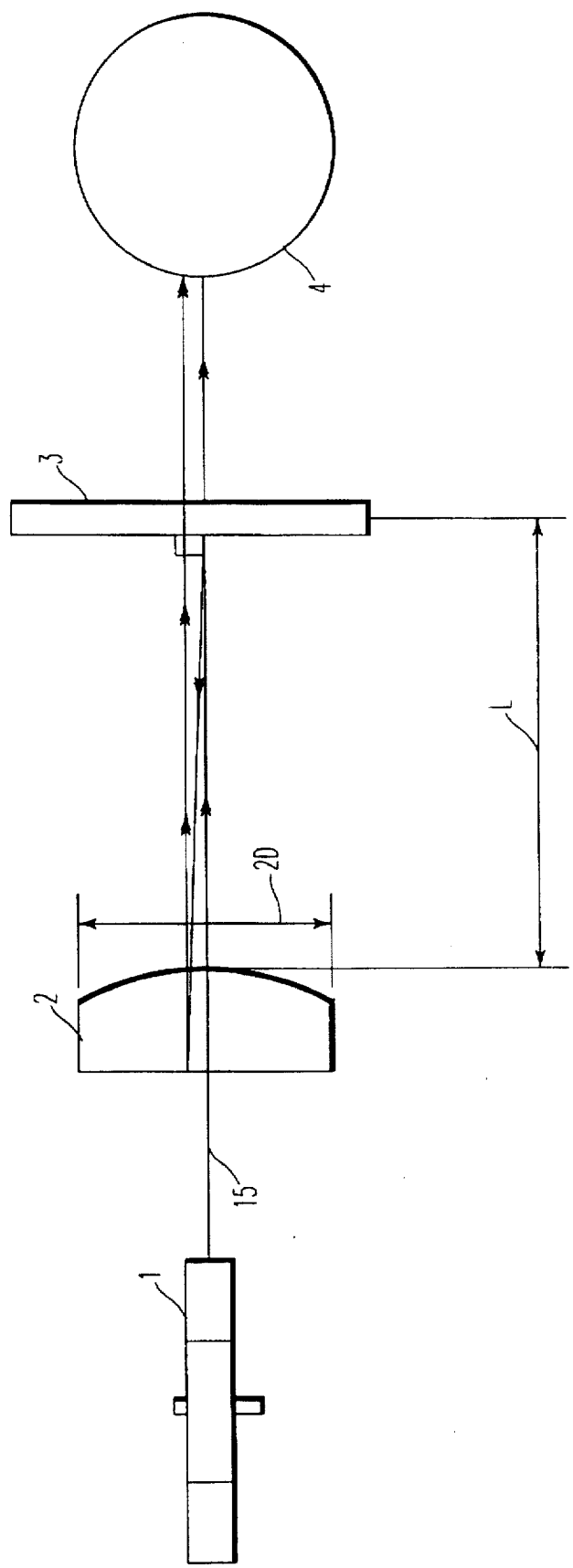
FIG. 10 shows a background optical scanner.

The embodiment shown in FIG. 8 also utilizes mirror 13, but is similar to the embodiment shown in FIG. 3 in that a shading element 9 is formed on the transparent parallel plate 3. The further embodiment shown in FIG. 9 shows a structure with a housing 11 and a cover 10, similarly as discussed above with respect to FIG. 4.

Each of these further embodiments of the present invention as shown in FIGS. 6–9 achieve similar benefits as discussed above with respect to the embodiments shown in respective FIGS. 1–4.

Obviously, numerous additional modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An optical scanner for impinging a light beam on a photosensitive body along an optical axis, comprising:

a lens through which the light beam passes;

a transparent plate through which the light beam passing through the lens further passes to impinge on the photosensitive body, the transparent plate being positioned at a predetermined non-perpendicular angle of inclination with respect to the optical axis, wherein a radius of the lens is defined as r, and a length between the transparent plate and the lens is defined as L, and further wherein the predetermined non-perpendicular angle of inclination is defined as θs and $$\theta s = \{\tan^{-1}(r/L)\}\frac{1}{2}.$$

2. The optical scanner according to claim 1, further comprising a shading member formed between the transparent plate and the photosensitive body for blocking a portion of the light beam passing through the transparent plate from impinging on the photosensitive body.

3. The optical scanner according to claim 1, further comprising a shading member formed on the transparent plate for blocking a portion of the light beam impinging on the transparent plate from passing through the transparent plate.

4. The optical scanner according to claim 1, wherein the predetermined non-perpendicular angle of inclination ranges between 2 and 10 degrees.

5. The optical scanner according to claim 1, further comprising a mirror positioned between the transparent plate and the lens.

6. The optical scanner according to claim 5, further comprising a shading member formed between the transparent plate and the photosensitive body for blocking a portion of the light beam passing through the transparent plate from impinging on the photosensitive body.

7. The optical scanner according to claim 5, further comprising a shading member formed on the transparent plate for blocking a portion of the light beam impinging on the transparent plate from passing through the transparent plate.

8. The optical scanner according to claim 5, wherein the predetermined non-perpendicular angle of inclination ranges between 2 and 10 degrees.

9. An image forming apparatus, comprising:

a photosensitive body;

a lens for focusing a light beam on the photosensitive body along an optical axis;

a transparent plate positioned between the focusing means and the photosensitive body, the transparent plate being positioned at a predetermined non-perpendicular angle of inclination with respect to the optical axis, wherein a radius of the lens is defined as r, and a length between the transparent plate and the lens is defined as L, and further wherein the predetermined non-perpendicular angle of inclination is defined as θs and $$\theta s = \{\tan^{-1}(r/L)\}^{1/2}.$$

10. The image forming apparatus according to claim 9, further comprising a shading member formed between the transparent plate and the photosensitive body for blocking a portion of the light beam passing through the transparent plate from impinging on the photosensitive body.

11. The image forming apparatus according to claim 9, further comprising a shading member formed on the transparent plate for blocking a portion of the light beam impinging on the transparent plate from passing through the transparent plate.

12. The image forming apparatus according to claim 9, wherein the predetermined non-perpendicular angle of inclination ranges between 2 and 10 degrees.

13. The image forming apparatus according to claim 9, further comprising a mirror positioned between the transparent plate and the lens.

14. The image forming apparatus according to claim 13, further comprising a shading member formed between the transparent plate and the photosensitive body for blocking a portion of the light beam passing through the transparent plate from impinging on the photosensitive body.

15. The image forming apparatus according to claim 13, further comprising a shading member formed on the transparent plate for blocking a portion of the light beam impinging on the transparent plate from passing through the transparent plate.

16. The image forming apparatus according to claim 13, wherein the predetermined non-perpendicular angle of inclination ranges between 2 and 10 degrees.

* * * * *